May 10, 1927.

T. MIDGLEY 1,627,799

TIRE CONSTRUCTION

Filed Dec. 9, 1922

INVENTOR
Thomas Midgley
BY
ATTORNEY

Patented May 10, 1927.

1,627,799

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

TIRE CONSTRUCTION.

Application filed December 9, 1922. Serial No. 605,776.

The present invention relates to the building of the laminated strain-resisting portion of tire casings, and has particular adaptability to cord tires. It has for one object the accurate control and coordination of the tensions imparted to the several laminations as the tire is being built. Other and further objects will appear from the following description and claims.

The invention will now be described with particular reference to the accompanying drawings, in which Fig. 1 is a diagrammatic section of a tire building core with one ply of material in place;

Figure 6:
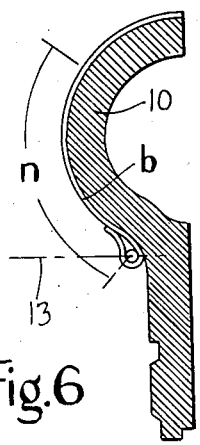
Fig. 6 is a diagrammatic view corresponding to a portion of Fig. 1, showing a later stage in the manufacture of the tire.

It is of importance in the manufacture of tire casings, particularly in a building process which lays the cords under accurate conditions of position and tension, to regulate the tension in the various plies so that no one ply will be forced to stand more than its due share of the strain. To this end the present invention is directed. The general principle of the invention can be best described by reference to Figs. 1 and 6. In these views 10 represents a ring core or building form, which may be of any usual or desired type, made sectional if the tire beads are to be inextensible. Over this form is laid in superposed reverse folds a circumferential series of cords 11, preferably according to the process described in my application Serial No. 448,891, filed March 1, 1921 Patent No. 1,603,856, Oct. 19, 1926. For convenience in practicing that method, as well as for controlling the tension according to the present invention, the bead portions of the casing are located during the building step further from the central plane of the tire than the positions they assume when the tire is finally vulcanized in the usual horseshoe cross section.

Figure 1:
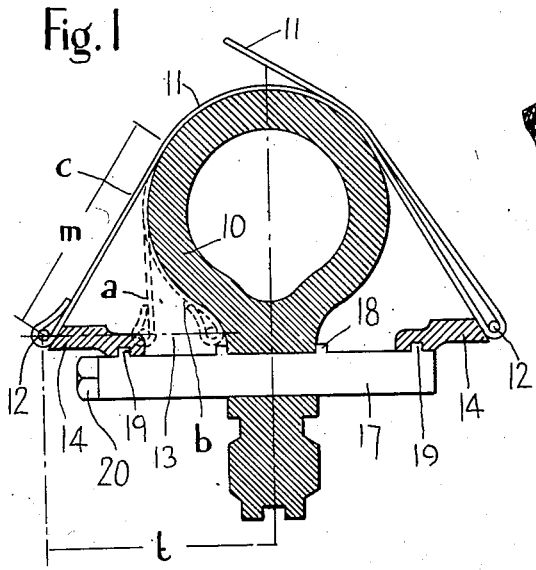

Assuming, in order to describe the matter clearly, that the tire material is originally built in the position $a$ of Fig. 1, and that the core 10 represents the internal shape in which the tire is vulcanized; if the sides of the tire structure are pressed into place adjacent the core ($b$, Figs. 1 and 6), a considerable stretching of the side wall portion of the tire will result. The bead 12, here shown as an endless wire ring, and in all cases relatively inextensible, will remain of a definite circumference, which will cause it to move (viewed cross-sectionally) along the line 13 in Fig. 1. The distance along the surface of the core to the line 13 (indicated by $n$ in Fig. 6), is greater than the distance from a similar starting point down the straight path $a$, resulting in a considerable tensioning of the material.

In other words the edge portions of the tire do not conform at the end of the building or laminating operations to either the building core or curing mold. However when the tire is cured under pressure either between a rigid core and mold or under internal pressure acting to hold the tire to an external mold the edge portions are forced to conform to the mold by the pressure of the molding operation. Therefore the edge portions of the tire are moved in the molding operation from the position in which they are originally built to their ultimate position. This part of the method has been practiced in tire making for a long time as it is thought that a better condition of the carcass adjacent the beads results from it. One feature of my invention is designed to particularly control and improve the tension and coordination of the various plies in their final or ultimate relation and such control is obtained by following the method described but with a particular placement of separate plies in the laminating operations to bring about a new relation between them.

In the preferred method described in the copending application referred to, the cords are laid originally under considerable tension, and not as much additional tension is desired as is the case where the tire is built of circumferential strips of cord fabric. For this reason the bead portions of the casing are held out beyond the position $a$ by building flanges 14, of a construction to be described. This position is indicated by $c$ Fig. 1. The length $m$ of material between the point of tangency with the core and the bead anchorage 12 is in this case preferably somewhat less than the distance $n$ between the same points when the material has been moved to position $b$ adjacent the core, so as to give a slight additional tension to the material. In operating this process, I have found that a stretch of about two percent is desirable, but this additional stretch may be varied or omitted according to the tension given in the original building operations.

Figure 3:
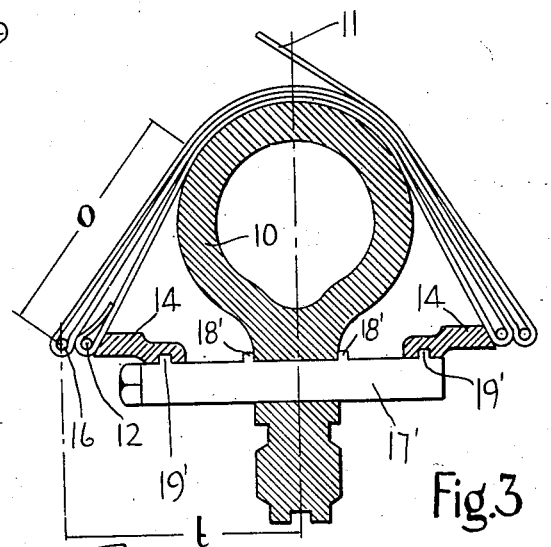
Fig. 3 is a view similar to Fig. 1 showing the laying of a succeeding ply.
Figure 7:
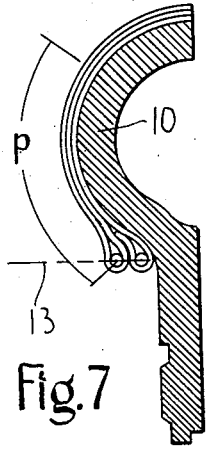
Fig. 7 is a view similar to Fig. 6 but showing the plies of Fig. 3.

The present invention is applicable whatever the additional tension may be, and relates to the control of the tension in the several plies so that no one ply will be caused to bear more than its due share of the strain. If the second ply of cord material were laid outside the first layer without any change of the bead position, it will be apparent from Fig. 3 that the distance $o$ will be greater than the corresponding distance $m$ of the first ply, due to the greater lateral distance of the bead anchorage 16 from the central plane of the tire. The distance $p$, (Fig. 7), after the material has been pressed against the core, is, however, relatively less than the corresponding distance $n$ of the first ply, as it extends more nearly in the vertical plane than the first ply, due to the thickening of the bead. The effect of these causes is to reduce the tension given to the outer plies in the finished tire, the tension progressively decreasing from the inner to the outer ply. Due to various causes it is sometimes desirable to have a condition the exact reverse of this, namely, where the tension progressively increases from the inner to the outer ply. Whether this latter effect is desired or whether the tension is desired uniform throughout the laminated tire structure, the present invention finds place, and gives a control of the tension according to the result which is wished.

Figure 2:
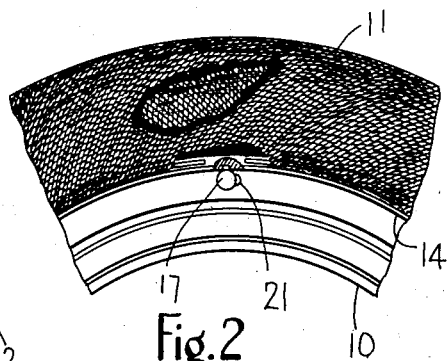
Fig. 2 is a side elevation thereof on a smaller scale.
Figure 4:
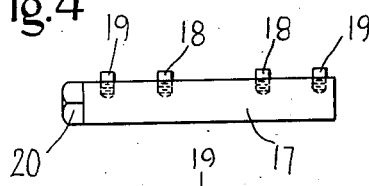
Fig. 4 is a detail of a portion of the apparatus shown in Fig. 1.
Figure 5:
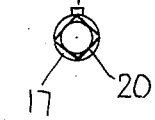
Fig. 5 is an end view thereof.

Briefly stated, the present invention consists in varying the lateral position of the bead portions of the tire casing during the application of the several plies so that the relation between the lengths of the free side portions of the tire structure (indicated in the drawings by $m$ and $o$) will bear the correct relation to the corresponding distances (indicated by $n$ and $p$) taken around the curved surface of the shaped tire to give the several tensions desired. This result is accomplished in the case shown for illustration by moving the circular building flanges 14 towards or away from the central plane of the core as successive plies are added. Automatic devices may be used for this purpose if desired, but I have shown in the drawings, as a simple contrivance for the purpose, pins 17, adapted to pass transversely through holes in the core and having lugs 18 bearing on the side of the core. Additional lugs 19 engage in slots in the inner surface of the building flanges 14 to hold the latter in proper positions. The building flanges are endless rings and preferably have slanting outer surfaces against which the bead portions of the casing bear. When it is desired to remove the pins they are rotated a quarter turn by a nut 20 on their ends, which brings the lugs in alignment with an enlargement 21 (Fig. 2) of the transverse hole in the core. The same movement frees lugs 19 from the grooves in the flanges. The pins can now be removed. A second set of pins 17' (Fig. 3), similar in all respects to pins 17 except that lugs 19' are a different distance from lugs 18' than lugs 19 from lugs 18 in order to change the lateral positions of the building flanges, are inserted and rotated to their flange-holding positions. The tire is now in condition to have the succeeding ply of material put in place.

While the invention has been described in connection with a particular building method for illustrative purposes it is not limited to such use, and changes in the building method and in the devices for carrying out the method may be made within the scope of the appended claims. In the drawings, the distance $t$ from the central plane of the tire to the last bead edge is shown as being held substantially constant in Figs. 1 and 3. For the size and shape of tire chosen for illustration this will cause the tension on the several plies to remain substantially the same after the tire has been molded into tire form, but with a very slightly decreased tension in the outer plies on account of the slight differences between the lengths $n$ and $p$. This results from the laying of the successive plies with a constant free edge distance $m$. In the performance of this specific procedure the first ply is temporarily slackened off by moving it nearer the vertical position $a$ (Fig. 1) by the change from pin 17 to pin 17' as described above. This temporary slackening off is rectified when the plies are finally molded to the shape shown in Fig. 7. If desired the tension can be increased in the plies from the inner ply outward by making the difference between successive positions of the inner bead anchorage 12 greater. By this means absolute control of the relative tension may be had.

Having thus described my invention, I claim:

1. A method of constructing multi-ply tires of substantial horse-shoe cross-section which comprises placing successive layers of material, anchoring the bead edges of each layer of material with a relatively inextensible anchorage while the bead edges of that layer are held out from their ultimate positions, and moving the bead edges of each layer after it is laid and before the laying of the succeeding layer, so that successive plies will, when finally shaped into the horse-shoe cross-section be tensioned to the desired degree.

2. A method of constructing multi-ply tires of substantial horse-shoe cross-section, which comprises laying a circumferential series of cords back and forth in reverse folds from one side of the tire to the other, inclosing a bead anchorage between each reverse fold while the bead edge of the fold is held out from its ultimate position, moving the bead edge of certain folds towards the central plane of the tire before subsequent folds are laid, laying such subsequent folds, and shaping the tire into its horse-shoe cross-section.

3. A method of building tires which comprises applying successive layers of material to a building former under substantially constant tension conditions, and slacking off the tension in one layer after it has been applied and before the application of the next.

4. A method of building tires which comprises applying successive layers of material to a building former under substantially constant tension conditions, anchoring each layer as it is applied, slacking off the tension in one layer after it has been anchored and before the anchoring of the next, and vulcanizing the tire under internal expansive pressure.

5. A method of building tires which comprises applying successive layers of material to a building former of substantially horse-shoe cross-section, the several layers being applied under substantially constant tension conditions, anchoring the edges of each layer at the bead diameter of the tire but while the bead edges of the layer are held out from their normal positions, slacking off the tension in one layer after it has been anchored and before the anchoring of the next, and vulcanizing the tire under internal expansive pressure with its bead edges held in their normal positions.

6. A method of constructing multi-ply tires which comprises shaping the plies into tire form with tensions increasing progressively and substantially uniformly from the inner ply to the outer.

7. A tire casing having a series of plies of strain resisting material, the material in the several plies being stretched to degrees varying substantially uniformly throughout the series, the inner ply being the least stretched, and the degrees of stretch increasing progressively from the inner ply to the outer.

THOMAS MIDGLEY.